No. 748,368. PATENTED DEC. 29, 1903.
C. H. HANFORD.
MACHINE FOR OPERATING ON CANS OR OTHER RECEPTACLES.
APPLICATION FILED JULY 18, 1903.
NO MODEL. 8 SHEETS—SHEET 1.
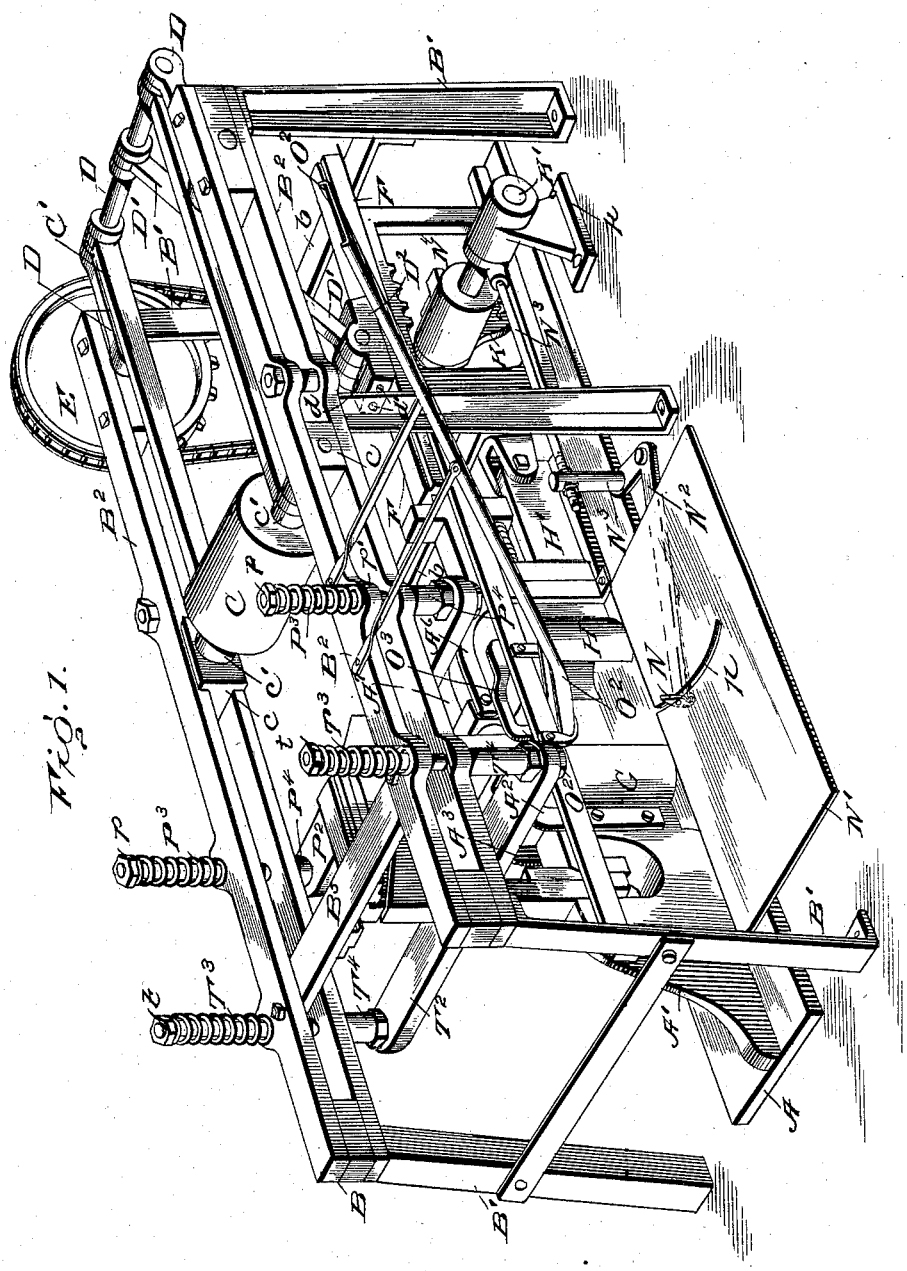

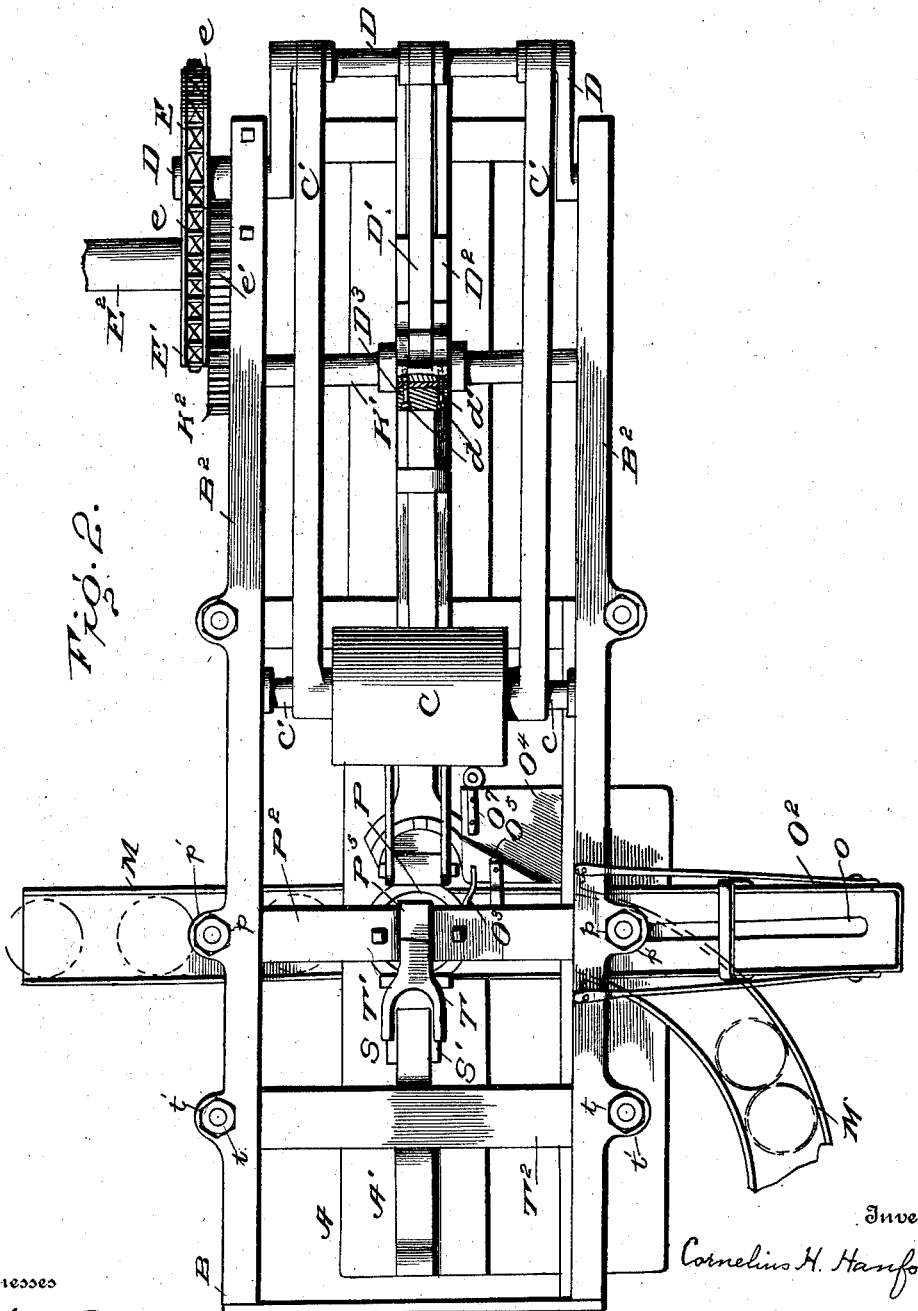

No. 748,368. PATENTED DEC. 29, 1903.
C. H. HANFORD.
MACHINE FOR OPERATING ON CANS OR OTHER RECEPTACLES.
APPLICATION FILED JULY 18, 1903.
NO MODEL. 2 SHEETS—SHEET 3.
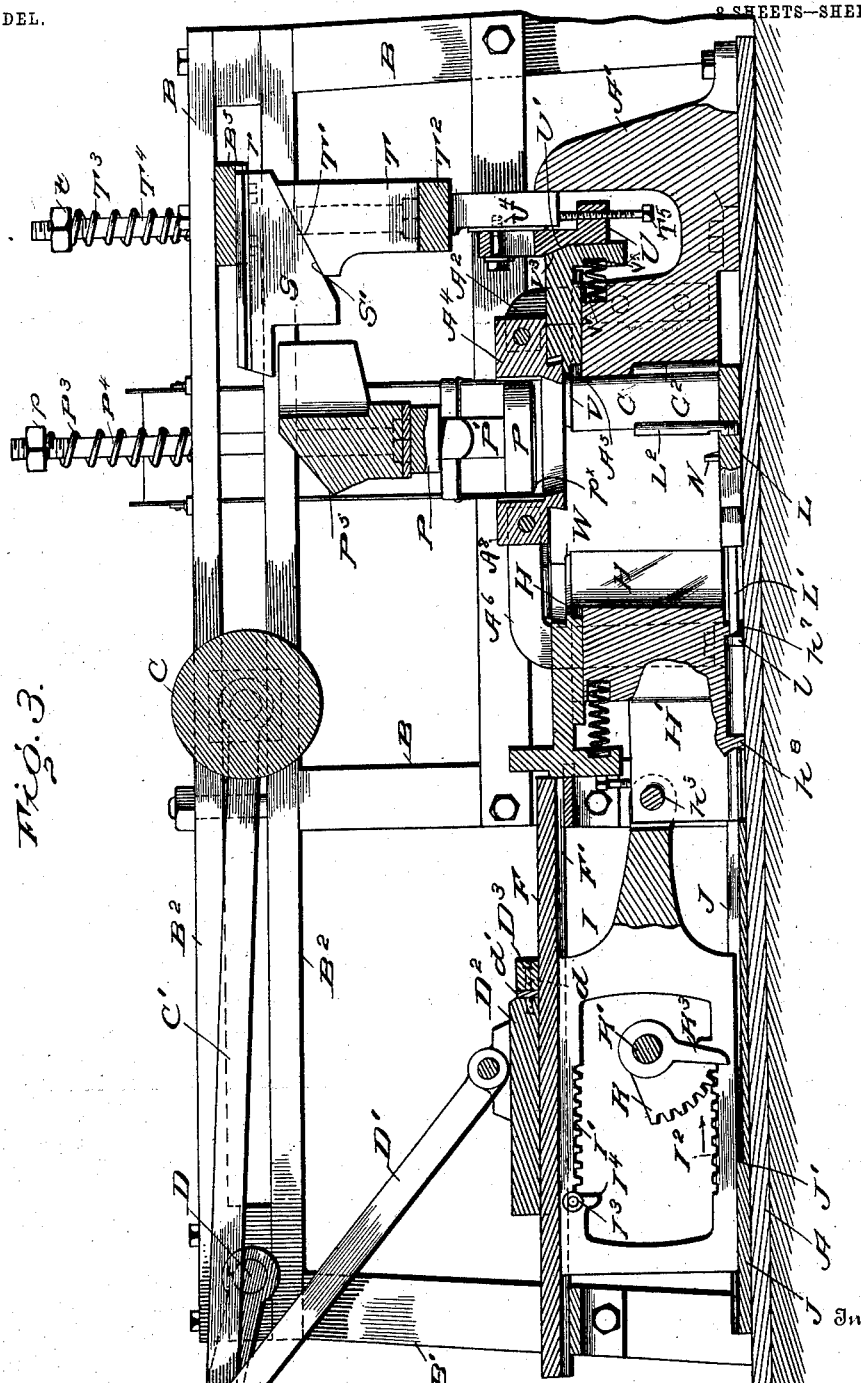
Witnesses
Inventor
Cornelius H. Hanford
By W. H. Babcock
Attorney

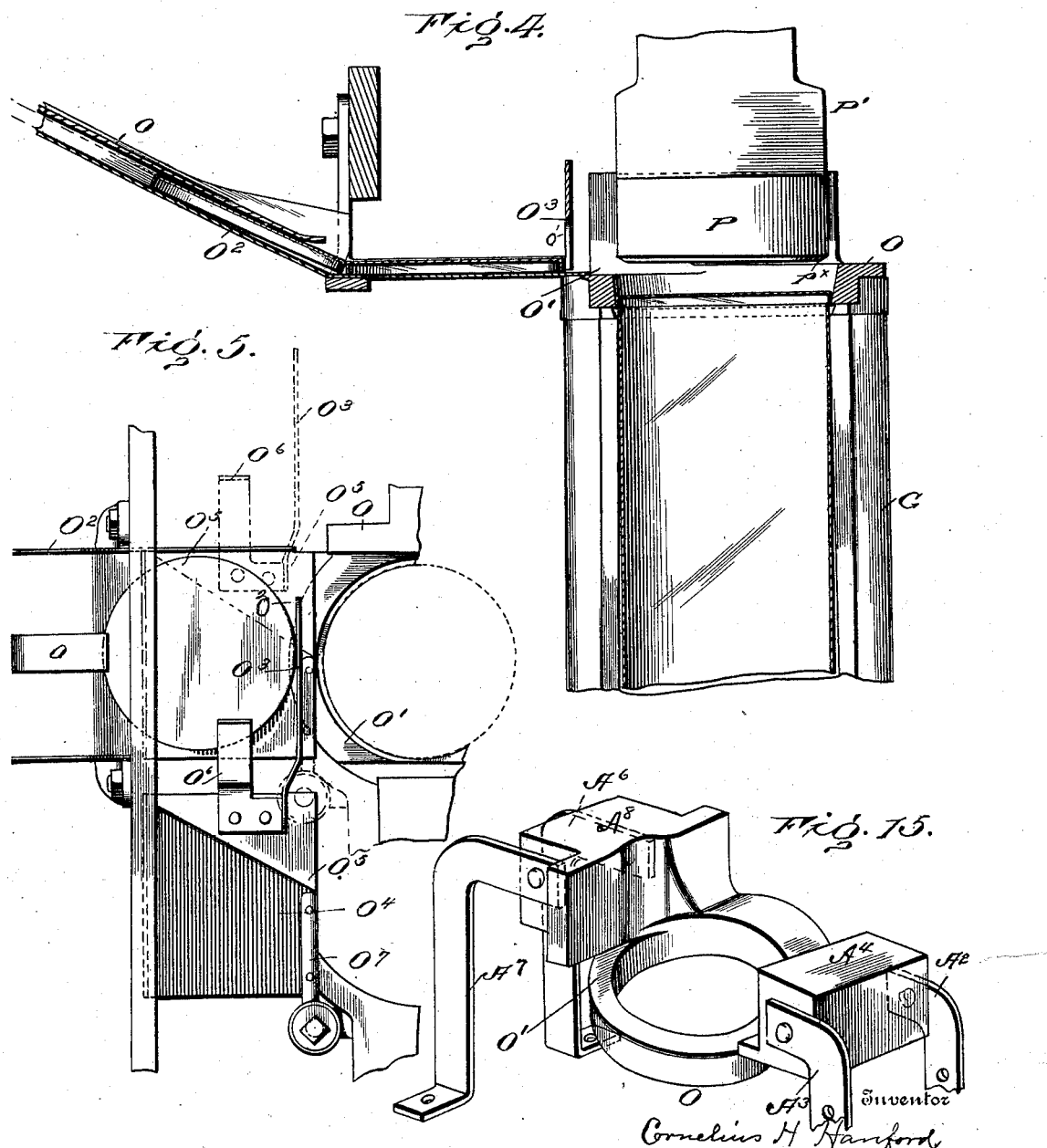

No. 748,368. PATENTED DEC. 29, 1903.
C. H. HANFORD.
MACHINE FOR OPERATING ON CANS OR OTHER RECEPTACLES.
APPLICATION FILED JULY 18, 1903.
NO MODEL. 8 SHEETS—SHEET 5.
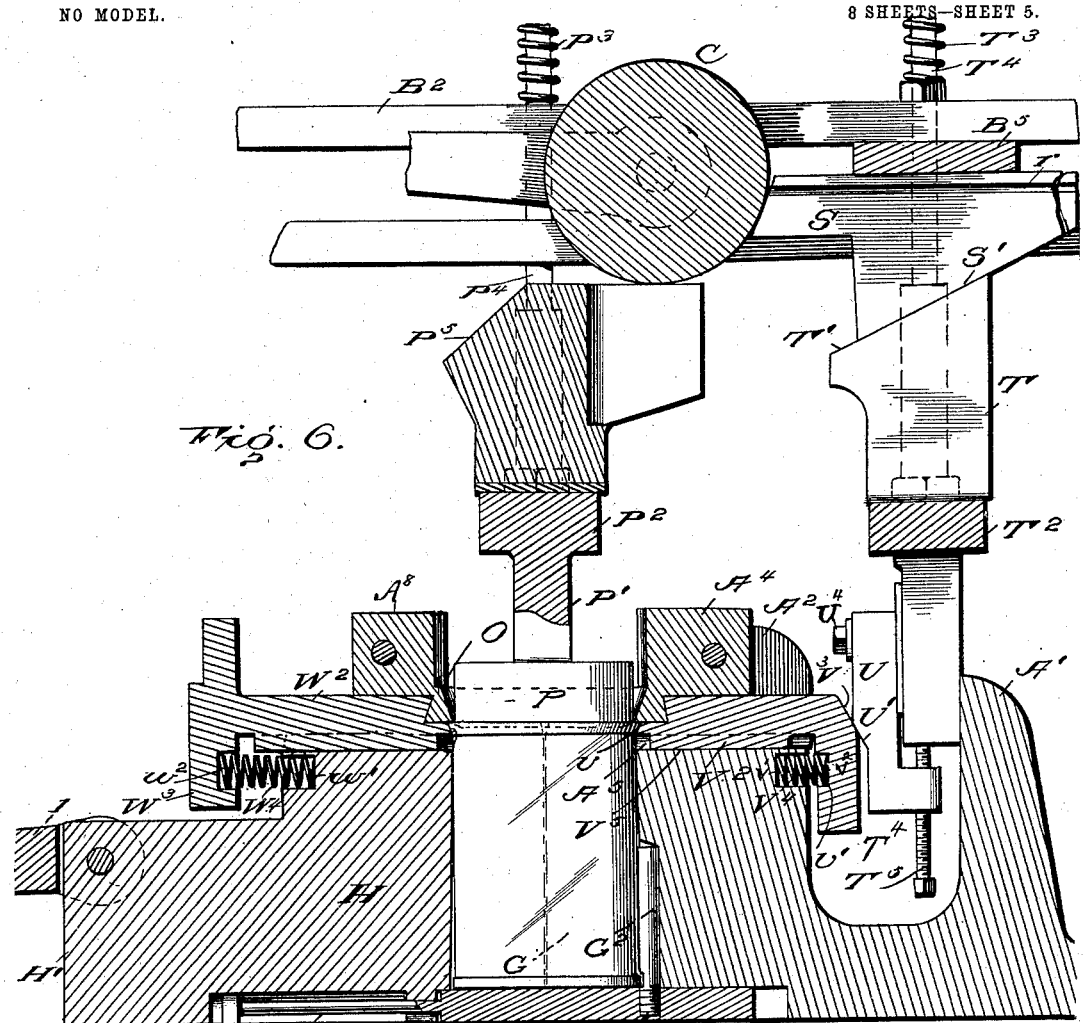
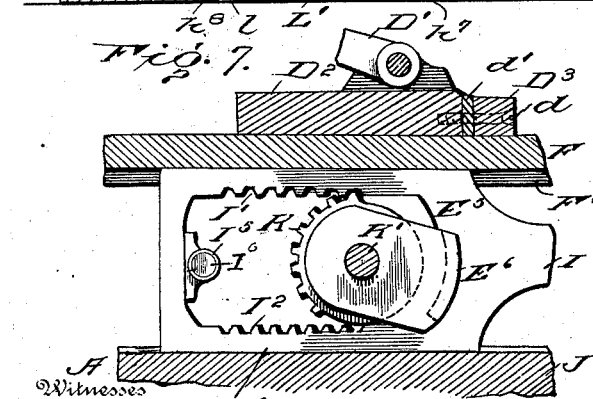
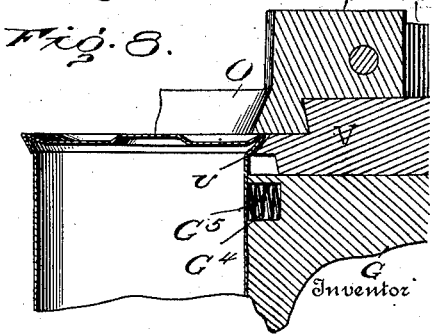
Witnesses
James E. Babcock
Inventor
Cornelius H. Hanford
By W. H. Babcock
Attorney

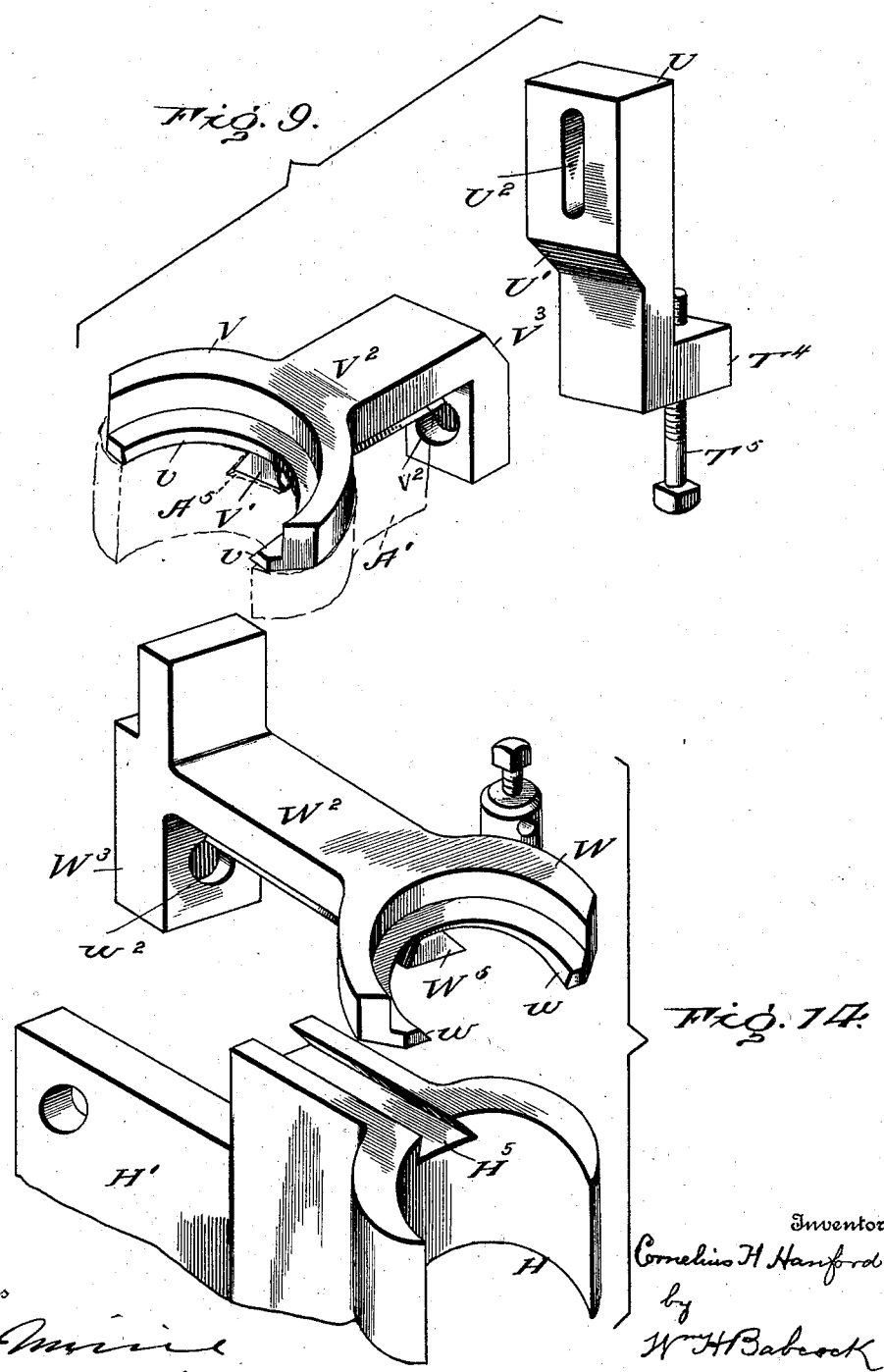

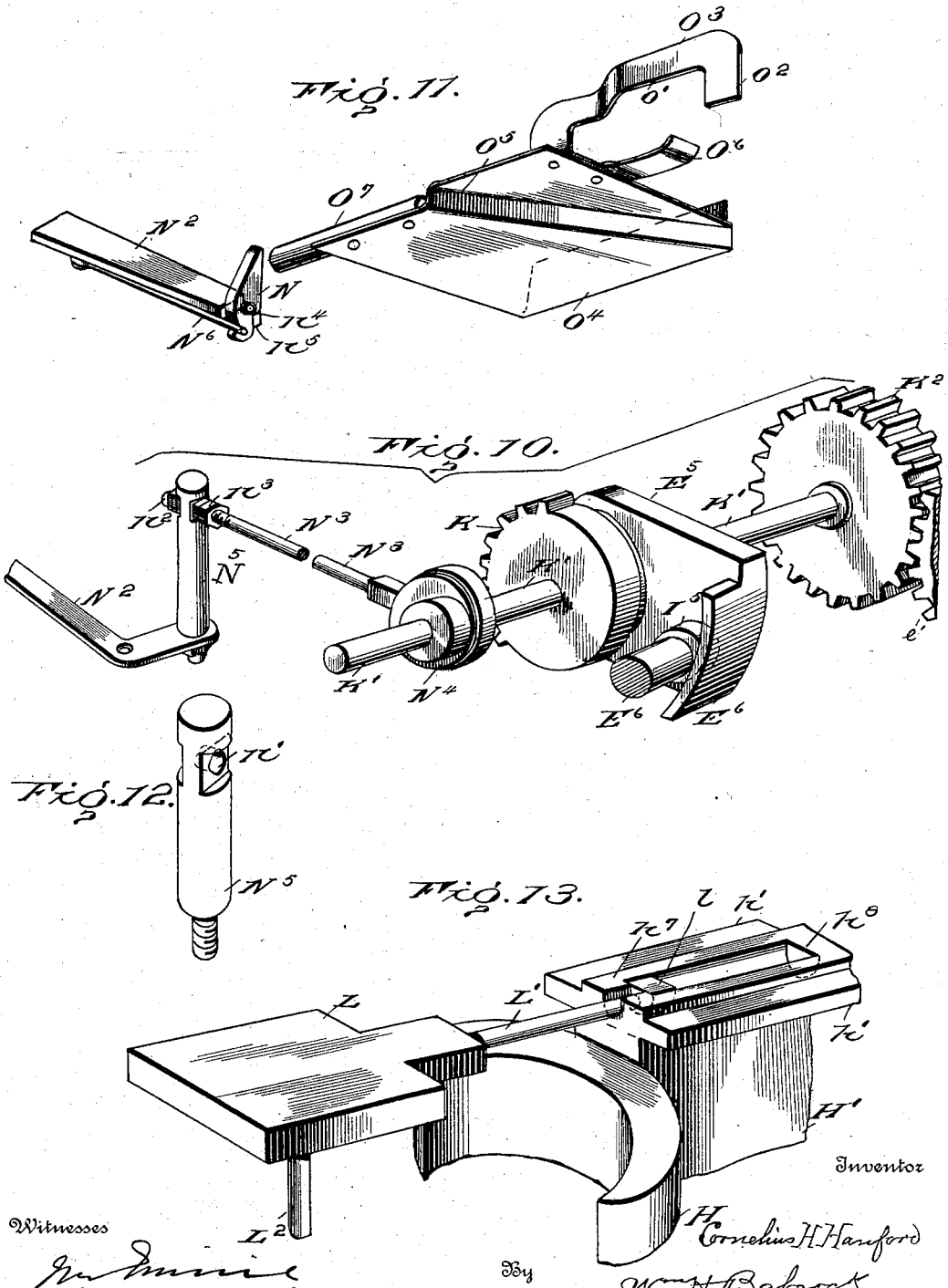

No. 748,368. PATENTED DEC. 29, 1903.
C. H. HANFORD.
MACHINE FOR OPERATING ON CANS OR OTHER RECEPTACLES.
APPLICATION FILED JULY 18, 1903.
NO MODEL. 8 SHEETS—SHEET 8.

Witnesses
Jno. Miner
W. A. Williams

Inventor
Cornelius H. Hanford
W. H. Babcock
Attorney

No. 748,368. Patented December 29, 1903.

UNITED STATES PATENT OFFICE.

CORNELIUS H. HANFORD, OF SEATTLE, WASHINGTON.

MACHINE FOR OPERATING ON CANS OR OTHER RECEPTACLES.

SPECIFICATION forming part of Letters Patent No. 748,368, dated December 29, 1903.

Application filed July 18, 1903. Serial No. 166,188. (No model.)

*To all whom it may concern:*

Be it known that I, CORNELIUS H. HANFORD, a citizen of the United States, residing at Seattle, in the county of King and State of Washington, have invented certain new and useful Improvements in Machines for Operating on Cans or other Receptacles; and I do hereby declare the following to be a full, clear, and exact description of the invention, such as will enable others skilled in the art to which it appertains to make and use the same.

The chief objects of this invention are to simplify mechanism for capping filled cans, to obviate the need for successive feed movements and stoppages of the cans before the covers are put on with consequent risk of injury to the cans or spilling the contents, to expedite the work, and economize labor and other outlays by capping and crimping in a single operation and at a single point. The can-holding clamp and divers other devices hereinafter described may, however, be used in various other operations pertaining to the manufacture of cans or other receptacles or to their treatment after manufacture. To effect these objects, my invention consists in the construction and combination of parts hereinafter more particularly set forth and claimed.

Figure 17:
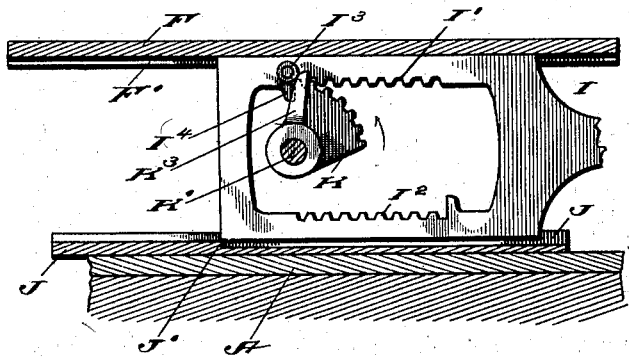
Figure 16:
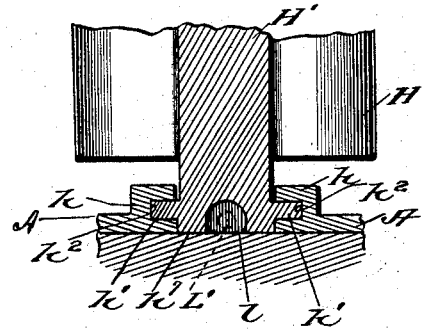
Figure 19:
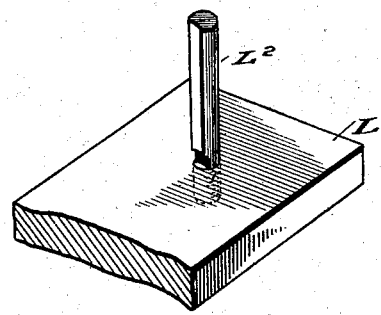
Figure 18:
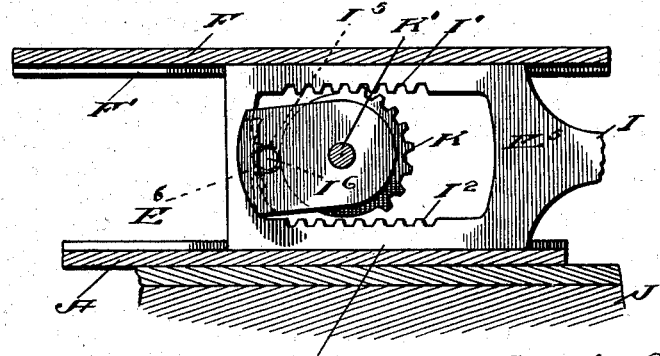

In the accompanying drawings, Figure 1 represents a perspective view of a machine embodying my invention. Fig. 2 represents a plan view of the same. Fig. 3 represents a vertical central longitudinal view of the same, the can-clamp being shown open. Fig. 4 represents a detail transverse vertical section of the hopper, gate, and cover supplying devices with a sectioned cover and can in position, the plunger being shown in elevation and the clamp in section. Fig. 5 represents a detail plan view of the same, the forward position of the gate and attached parts for opening being shown in dotted lines. Fig. 6 represents a vertical longitudinal central section through the crimping-jaws and their operating mechanism and proximate devices, parts of the mechanism and frame being shown in external elevation, the clamp and crimping-jaws being closed. Fig. 7 represents, partly in longitudinal section and partly in elevation, a modification of the mechanism for actuating and temporarily locking the movable clamp-section. Fig. 8 represents a detail sectional view, partly in elevation, of an alternate device for freeing the can, a part of the latter and some proximate devices being also shown in section. Fig. 9 represents a perspective detail view of the crimping-jaw V, hereinafter described, and the adjustable wedge for operating the same, these parts being slightly detached for convenience of illustration and the closing position of the said jaw being shown in dotted lines. Fig. 10 represents a perspective detail view of the shaft K', hereinafter described, and the devices carried thereby with a portion of the mechanism driven by said shaft for actuating the can-feeding finger N, some parts being broken away. Fig. 11 represents a bottom perspective of the cover-controlling gate and attached cover-feeding and corrugating parts, also showing the said can-feeding finger. Fig. 12 represents a detail view, enlarged, of the slotted upper end of post $L^2$, forming part of the mechanism for actuating the said finger. Fig. 13 represents a detail perspective view of the movable clamp-section, the can-supporting slide, the can-freeing pin, and the connections between the said slide and jaw. Fig. 14 represents a detail perspective view taken from above of the said movable clamp-section and the cover crimping jaw W, hereinafter described, the two devices being separated to show the connections between them. Fig. 15 represents a detail perspective view of the hopper O. Fig. 16 represents a detail cross-section of the guideway $h$, having grooves $h^2$, and the extensions H' of clamp-section H, having ribs $h'$ running in said grooves. Fig. 17 is a detail side view of the rack-frame and proximate parts similar to the corresponding portion of Fig. 3, but showing the said frame lifted out of engagement with the locking-shoulder and the first tooth of the segment and the long tooth $I^4$ of the upper rack about to engage. Fig. 18 is a detail view similar to Fig. 7, but with the locking-flange $E^6$ and the roller on the locking-stud $I^6$ in engagement; and Fig. 19 represents an enlarged detail view of the pin $L^2$, having a concave inner face.

A designates the bed-plate of the machine, and B the frame, consisting principally of three pairs of posts or standards B' and two pairs of horizontal bars $B^2$, running the entire length of the machine at the top of the sides thereof. The longitudinal bars of each of these pairs are located at a slight interval, so as to constitute guideways for sliding bearing-blocks $c$, in which a heavy roller C is journaled, said roller being used for operating the plunger and one of the crimping-jaws, as hereinafter described. A pair of pitmen $C'$ connect the gudgeons $c'$ of the said roller to a cranked main shaft D, journaled in the said frame and having on one end a sprocket-wheel E, which is geared by an endless chain $e$ to a similar wheel $E'$ on a shaft $E^2$, driven by any suitable motor directly or indirectly. From the said main shaft another pitman $D'$ extends to a slide $D^2$, traveling longitudinally on a guideway F, fixed to cross-bars $b$ of the frame B, which slide serves to operate the other crimping-jaw, as hereinafter described. While the said plunger and the said crimping-jaws are applying the cover to the can and crimping it thereon, which is the prime function of the machine, it is necessary that the can should be securely held by means which will correct and retain its shape. To this end I employ a fixed clamp-section G and a movable clamp-section H, which together constitute a can-holding clamp approximately cylindrical in its interior shape and tapering slightly from the bottom to the top (or from the middle of the clamp to the top, as shown in one of the detail figures,) to compress, center, and shape the top of the body of the can for facilitating the fitting of the cover thereon. The said fixed section G is rigid and braced by an upright block $A'$, bolted to the bed-plate A. The movable section H is provided with a rearward extension $H'$, running in an undercut guideway $h$, fast on the said guide-plate, the said extension having lateral ribs $h'$, which enter the longitudinal grooves $h^2$ of the said guideway. The extension $H'$ is connected by a pivot $h^3$ or by a link or other loose connection to a bar or slide I, reciprocating in a fixed lower guideway J and the guideway F aforesaid, the under side of the latter being grooved at $F'$ to receive and guide the upper edge of the said bar or slide I. The greater part of the latter is formed into a rectangular frame, with a considerable opening in the middle and having an upper and lower toothed rack (marked, respectively, $I'$ and $I^2$) formed on the inner faces of the upper and lower parts of the said frame, these two racks constituting an integral double rack for the alternate engagement with a toothed rotary segment K. This segment is carried by a short transverse shaft $K'$, journaled in bearing-standards $k$, fast to bed-plate A, said shaft being provided at its outer end with a pinion $K^2$, meshing with a pinion $e'$ on driving-shaft $E^2$ aforesaid. When the said quadrant meshes with the lower rack $I^2$, it advances the clamp-section H to the clamp-section G, closing the clamp. When the said segment engages the upper rack $I'$, it withdraws the said clamp-section H, opening the clamp.

It is necessary to leave the cam securely clamped during the operations of applying and crimping the cover. To this end I provide means for automatically locking the section H when it is brought against the section G in closing the clamp and for automatically releasing it after the crimping is complete. For this purpose I cut away the forward part of the lower guideway J, leaving a forward facing shoulder $J'$ at such point that when the segment has passed away from engagement with the lower rack the slide or frame I will drop to the lower level of the forward part of the said guideway and be locked by the said shoulder against withdrawal. The shaft $K'$ carries also on each side of the frame a cam or horn $K^3$ of curved surface, which wipes against a stud $I^3$ on each side of the upper part of said slide or frame, so as to lift the latter out of engagement with the said shoulder and bring the said segment into engagement with the upper rack. To insure the accuracy of the meshing of the segment and rack, the rear tooth $I^4$ of the latter is made longer than the rest. When this tooth $I^4$ is struck by the first tooth of the segment in the direction of rotation indicated by arrow, the length of tooth $I^4$ compels the said segment-tooth to strike its inclined face instead of locking-points together, and the other teeth thereafter naturally make contact in the proper manner. Of course the teeth of the segment and of the racks are so calculated in number and location that the movements of advance and withdrawal are made at the proper times for the purposes above indicated. As an equivalent modification I may use the construction shown in Fig. 7, which dispenses with the aforesaid shoulder and cam and uses instead a flanged locking cam-wheel $E^5$ on shaft $K'$, passing its flange $E^6$ at the proper moment behind an antifriction-roller $I^5$ on a stud $I^6$, attached to the said frame, slide, or bar I. The shaft $K'$ and the said cam-wheel continue to turn; but the flange $E^6$ holds the clamp closed until it passes from behind the said roller and stud, when the said segment engaging with the upper rack I operates to withdraw, as before, the length of the flange with relation to the number and arrangement of the said teeth having been duly calculated.

The movable section H of the clamp carries with it a cam-supporting slide L, which forms the bottom of the clamp and the forward end of which extends into an opening under the fixed section G when the clamp is closed. This slide has a rearwardly-extending stem $L'$, whereby it makes a sliding connection with the said section H, the latter receiving said stem in its lower part and being provided with a pair of shoulders $h^7$ $h^8$, which come in contact alternately with a button $l$ on the end of the said stem in the reciprocation of said section H. These parts are arranged at such an interval that the section H traverses half its distance in withdrawing before affecting the slide L. The forward shoulder $h^7$ then comes in contact with the said button, and the section H carries the slide L with it during the remainder of its movement in withdrawal. The action is necessary because the section H must move away from the section G a distance equal to the diameter of a can to allow the escape or discharge of the latter, whereas the can itself does not need to be moved out from the interior of the other section more than far enough to clear the same in its discharge—that is to say, the central point of said cam travels only half as far as the movable section H of the clamp, and the slide which carries the can of course moves only as far as the can, the interval between the shoulders $h^7$ and $h^8$ being calculated to allow the required difference in travel. When the section H moves forward, it leaves the slide L unaffected until the rear shoulder $h^8$ comes in contact with the button and moves it and the slide, along with the section H, until the clamp is closed.

As the clamp closes tightly on the can the latter tends to adhere to the stationary section G, and some special provision is necessary to insure its withdrawal. To this end I provide the forward part of the slide L with an upright pin $L^2$ or other raised part, fitting into a recess $G^2$ of similar form in the inner face of the said fixed section G, so as to be out of the way of the cam when the clamp is closed, but drawn by the rearward movement of slide L against the forward side of the can to free it from section G. This pin is flat or concave on the side toward the can to insure its action thereon in the longitudinal line of the machine. Instead of a device thus carried by the slide a spring $G^4$, Fig. 8, may be set into a recess $G^5$ in the inner face of the said section G, protruding sufficiently to be compressed by the can and releasing the latter from the said section by its expansive action as soon as the pressure of the movable jaw H on the can is withdrawn.

It will be observed that the clamp is always in the same horizontal plane, which is that of the rectilinear reciprocation of its movable section H; that the opening and closing are effected automatically and with much more force and certainty than would be possible by hand; that there is no chance for an imperfect fit of the sections together, as section G is always in one spot and section H moves only to it and from it in a direct line; that the can is held exactly in one spot during its treatment in the machine, and hence is exempt from friction and other possible injury, while the clamp corrects any slight inaccuracy of shape while protecting it against all further deformation.

Any suitable source of supply for the can may be employed, from which they pass through an inclined chute M or an equivalent device to the clamp. A second chute M' on the opposite side of the clamp receives one by one the discharged cans, conveying them to any desired receptacle or mechanism. Each can is forced out of the clamp by the pressure of the one next in order in the transversely-moving stream or series of cans, the latter can being impelled by finger N, extending up through a curved guide-slot $n$ in a fixed plate N', which covers the greater part of a horizontal bell-crank lever $N^2$, carrying the said finger at the end of its longer arm. The said lever is pivoted to a fixed attachment of the bed-plate, and a raised rod or bar $N^5$ connects the end of its short arm to a pitman $N^3$, driven by an eccentric $N^4$ on shaft K', the upper end of said rod or bar being provided with an opening $n'$ of sufficient vertical diameter to allow a certain amount of vertical play at the joint between the said rod or bar and pitman. The latter is also screw-threaded for some distance back from its end and provided with nuts $n^2 n^3$ on each side of the said bar $N^5$, which allow a certain amount of adjustment of the joint to compensate for wear and changes of temperature. The said finger is pivoted on a stud $n^4$ at the end of the long arm of the said lever and free to turn inward, so that the cans may successfully pass over it toward the clamp without impediment, while a shoulder $n^5$ on the end of the said arm prevents it from turning backward. A spring $N^6$, connected to said finger at one end and to said lever at the other, returns the said finger to its upright position. The said eccentric and parts operated thereby are calculated to give an inward sweep of the said finger toward the clamp just after it is automatically opened, as before described, thereby forcing the can which has last passed over it into the open clamp, and thus driving out the can which has been crimped and is ready for discharge. A hopper or guide-ring O, arranged above the said clamp, receives the covers successively through a passage or opening O', left by cutting away the upper part of its receiving side from a chute $O^2$, which has a cover or narrow protective plate $o$ for preventing the dislodgment or jumping of the cans. The opening O' is intermittently closed by a sliding gate $O^3$, which moves with a plate $O^4$, having on its under side a shoulder $O^5$, so inclined and slightly curved as to force the covers successively through the said opening by pressure on the outer part of the periphery of each. The said plate is also provided with a guard $O^6$, extending over its forward edge, approximately parallel to the said gate, these parts being so arranged with respect to each other and to the rest of the machine that the said gate closes the opening in the said hopper so long as the clamp is open, but when the said clamp closes the gate leaves the passage O' free, and the shoulder $O^5$ forces a can-cover through the opening O' into the hopper, the preceding can-cover having been previously forced down by the plunger before mentioned and removed with its can. To effect this, the said plate is connected by a rod $O^7$ to a rigid attachment $O^8$ of the movable clamp-section H and of course advances and recedes exactly therewith. The said gate is bent upward in the middle or correspondingly cut away at $o'$ to leave passage for the cover when the gate is in its most forward position. The solid terminal part $o^2$ of the said gate closes the opening aforesaid. The plunger is marked P and has its operative face beveled peripherally at $p^\times$ to depress the middle of a can-cover, as is usual, while leaving a rim slightly raised around its periphery, also to slightly expand the upper edge of the can-body after the cover has been fitted thereon, the edge of the can being up in this raised peripheral part, with the flange of the cover overlapping it. Such expansion aids in binding the can body and cover together. The said plunger has a stout stem $P'$, rigidly connected to a cross-bar $P^2$, which is supported by strong springs $P^3$ on top of the upper horizontal bars $B^2$ of the frame and main guideway. Rods $P^4$, extending up through the said springs, carry nuts $p$ at their upper ends, which bear on said springs and are guided by perforated lugs $p'$ of bars $B^2 B^2$, through which they pass. An inclined plane $P^5$ on top of said cross-bar is depressed by the roller C traveling over it, and the said cross-bar and plunger move down with it, being raised by the said supporting-springs, when the said roller passes beyond the said inclined plane and frees the said parts.

The crimping-jaws V and W are arranged to close on the flange of the can-cover just below the hopper immediately after the plunger has pressed the cover on the can and to crimp the said cover on the upper end of the can-body, this action being in combination with the spreading operation of the plunger on the said upper end, as already set forth.

A cross-bar $B^5$ in the upper part of the forward end of the frame is provided with a longitudinal guideway $r$, in which slides a block or wedge S, having on its under side an inclined plane $S'$, beveled upward and forward, so as to act on the correspondingly-shaped upper end $T'$ of a vertical bar T, which is fast in a movable cross-bar $T^2$ (similar to cross-bar $P^2$) and carries the same down with it, this cross-bar $T^2$ being supported by springs $T^3$, which correspond to the springs $P^3$ in construction and arrangement, rods $T^4$ corresponding to rods $P^4$, nuts $t$ corresponding to nuts $p$, and lugs $t'$ corresponding to lugs $p'$ being duly provided. The rear lower end of the vertically-moving bar T carries a detachable wedge U, the operative face of which is provided with an inclined plane $U'$, its inclination being downward and forward, so that it may act on the similar inclined face V of the forward end of the stem $V^2$ of the longitudinally and horizontally reciprocating semicircular forward crimping-jaw V. The said stem slides between the upper part of block $A'$ aforesaid and vertical side plates $A^2 A^3$, which are bolted to said block, the upper ends of the said plates being also bolted to a block $A^4$, cast with the hopper O to support the same. The said crimping-jaw V is high enough to fit on a part of the circumference of the said hopper; but its lower part, presenting the operative face $v$, extends under the said hopper and above the fixed section G of the can-holding clamp. The latter parts will tend to brace it and keep it true in its motion and operation; but to further insure accuracy in this respect, which is very important, I provide the under side of the stem $V^2$ with a dovetailed rigid block $V^5$, which slides in a similarly dovetailed guide-groove $A^5$ in the top of block $A'$, holding the crimping-jaw V absolutely down to its work without impeding its opening and closing movements. As the bar T descends the wedge U of course moves the crimping-jaw V into closing position, while on its release from end pressure the said crimping-jaw is moved again into the open position by a replacing-spring $V^4$, interposed between the rear face of block $A'$ and an integral downwardly-bent arm $V^3$ of the stem $V^2$ at the end thereof. The ends of this spring set for greater security into recesses $v'\ v^2$ of the said block and arm. To compensate for wear of the jaw V and the inclined faces and for the effect of changes in temperature, the wedge U is made vertically adjustable, preferably by providing it with a vertical slot $U^2$, through which passes a clamping-screw or bolt $U^4$, connecting it to the bar T. To permit the said wedge to be easily raised in adjustment without direct application of the operator's hand after the said screw or bolt has been loosened, the lower end of the said wedge is provided with a horizontal ledge $T^4$, extending under the said bar and screw-tapped for the upward passage of an adjusting-screw $T^5$, which may be made to bear upwardly against the lower end of the said bar. The wedge U will be raised or lowered, according to the direction in which the screw $T^5$ is turned, while the end of the screw is in contact with the end of the bar T. Said screw is not a necessity, but merely a convenience, as the said wedge may be lifted by hand, the alternate loosening and tightening of bolt or clamping-screw $U^4$ providing for the vertical adjustment of said wedge as the latter is lifted or allowed to descend.

The rear crimping-jaw W is provided with a stem $W^2$ and arranged similarly to jaw V with respect to the hopper and can-holding clamp. It is supported on and moves with the movable section H of the clamp during the forward and backward motion of said section, but is allowed independent forward and backward motion on the same, being connected thereto by a dovetailed block $W^5$ and guide-groove $H^5$, corresponding in construction and function to block $V^5$ and groove $A^5$ aforesaid. The said stem is guided by plates or arms $A^6$ and $A^7$, respectively, corresponding in construction and function to plates $A^2$ and $A^3$, before described, and connected at their upper ends in like manner to a block $A^8$, integral with the hopper O and diametrically opposite to block $A^4$, to which it corresponds. The independent forward or closing movement of the said crimping-jaw W is given by the forward stroke of slide $D^2$, which carries a facing-block $D^3$, adjustable on the operative end of the said slide by screws $d$ and packing $d'$ to correspond to the already-described adjustment of the devices operating the other crimping-jaw V. By loosening these screws, diminishing or increasing the number of layers of packing or their thickness, and tightening the said screws again such adjustment is readily effected. The opening movement of the said jaw W is caused by a spring $W^4$, interposed between the clamp-section H and an arm $W^3$ of the stem $W^2$ of crimping-jaw W, the ends of the said spring fitting into recesses $w'$ $w^2$ of the said clamp-section and arm. The above parts correspond to those marked $V^2$, $V^3$, $V^4$, $v'$, and $v^2$, before described, as to construction, arrangement, and operation.

The crimping-faces $v$ $w$ of the crimping-jaws are slightly beveled downward to compress and crimp the annular flange of the cover on the upper end of the can-body. The curved crimping-jaws V W meet, closing the circle.

In using the machine with cans which are elliptical in cross-section or of any form other than circular in cross-section the form of the plunger, the clamp-sections, and the crimping-jaws must be correspondingly changed. In all figures where the internal taper appears it is necessarily exaggerated, as it is so slight in the machine that it would be almost imperceptible on the reduced scale of the drawings if kept to the same proportion.

This machine effects the capping and crimping of a filled can in a single operation by a single turn of the cranked shaft and at a single spot, which conduces to simplicity and cheapness of construction. Its structure is also obviously very strong.

Having thus described my invention, what I claim as new, and desire to secure by Letters Patent, is—

1. In a machine for operating on cans and other receptacles, a can-holding clamp consisting of two separable sections having collectively the form of a cylinder with a slight internal upward taper, in combination with mechanism for opening and closing the said clamp for the purpose set forth.

2. In a machine for operating on cans and other receptacles, a can-holding clamp consisting of a permanently-fixed section and a corresponding movable section, in combination with the reciprocating mechanism connected to said movable section for advancing it to said fixed section and withdrawing it therefrom substantially as set forth.

3. In a machine for operating on cans and other receptacles, a can-holding clamp consisting of a fixed approximately semicylindrical section and a correspondingly-shaped movable section, in combination with a support for the can, movable with the latter section and mechanism for moving the said support and section toward and from the said fixed section substantially as set forth.

4. In a machine for operating on cans and other receptacles, a can-holding clamp consisting of a fixed approximately semicylindrical section and a correspondingly-shaped movable section, in combination with a can-supporting slide adapted to fill the bottom of the said clamp and fit into or under the said fixed section, and mechanism for moving the said slide and movable section toward and from the said fixed section substantially as set forth.

5. In a machine for operating on cans and other receptacles, a can-holding clamp consisting of a fixed section and a movable section, in combination with mechanism for moving the latter section toward and from the other, a can-supporting slide, which is movable with the latter section, and devices which stop the said slide when the movable section has made only a part of its travel in withdrawal for the purpose set forth.

6. In a machine for operating on cans and other receptacles, a can-holding clamp consisting of a fixed section and a movable section, in combination with mechanism for moving the latter section toward and from the former, a can-supporting slide movable with the said movable section and connections between the latter and the said slide which allow the said slide to be left behind when the said section has traveled in withdrawal a distance equal to half the diameter of a can, the said movable section being arranged to travel the whole distance of the diameter of a can substantially as and for the purpose set forth.

7. In a machine for operating on cans and other receptacles, a can-holding clamp consisting of a permanently-fixed section and a movable section, in combination with mechanism for advancing the said movable section toward the said fixed section and withdrawing it therefrom, and means for automatically locking a part of the said mechanism and the said movable section, to hold the can securely, substantially as set forth.

8. In a machine for operating on cans and other receptacles, a can-holding clamp consisting of a permanently-fixed section and a movable section, in combination with guides for directing the movement of the latter section in a right line toward or from the former section, mechanism for giving this reciprocal motion to the said movable section, and means for locking automatically a part of the said mechanism and movable jaw for the purpose set forth.

9. In a machine for operating on cans and other receptacles, a can-holding clamp consisting of a permanently-fixed section and a movable section, in combination with mechanism for reciprocating the said movable section in a right line, means for automatically locking the said mechanism and movable section and means for automatically and intermittently freeing the said mechanism to permit the withdrawal of the said movable section substantially as and for the purpose set forth.

10. In a machine for operating on cans and other receptacles a can-holding clamp consisting of a fixed section and a movable section, in combination with mechanism for reciprocating the said movable section to open and close the clamp, a can-supporting slide movable with the latter section, and means operating to free the can from the fixed section of the clamp as the said slide begins to withdraw for the purpose set forth.

11. In a machine for operating on cans, a can-holding clamp consisting of a fixed section and a movable section, in combination with mechanism for reciprocating the said movable section to open and close the clamp, a can-supporting slide moving with the latter section, and means moving with the said slide and section and acting on the said can to free it from the fixed section for the purpose set forth.

12. In a machine for operating on cans and other receptacles, a can-holding clamp consisting of a fixed section and a movable section, in combination with mechanism for reciprocating the said movable section to open and close the clamp, a slide movable with the latter section and an upright part on the said slide beyond the can to free the can from the fixed section substantially as set forth.

13. In a machine for operating on cans and other receptacles, a fixed clamp-section having a recess in its inner face, a can-supporting slide having an upright pin, which fits into the said recess when the clamp is closed, a movable clamp-section carrying with it the said slide and thereby causing the said pin to free the can from the fixed section in withdrawal and mechanism for reciprocating the said movable jaw and slide substantially as set forth.

14. In a machine for operating on cans and other receptacles a can-holding clamp, consisting of a fixed semicylindrical section and a movable semicylindrical section, the former having an upright recess in its inner face, and an opening below it in combination with mechanism for reciprocating the said movable section to close and open the clamp, a can-supporting slide attached to said movable section and having its forward end adapted to fit into the said opening when the clamp is closed and an upright can-releasing pin rising from the forward part of the said slide beyond the can, and fitting into the said recess when the clamp is closed, but operating to free the can when the slide withdraws, substantially as, and for the purpose set forth.

15. In a machine for operating on cans or other receptacles, a can-holding clamp consisting of a fixed section and a movable section, in combination with a double rack and connections for reciprocating the latter section, a toothed segment turning in the space between the two racks and engaging them alternately to advance or withdraw the said section, and a part adapted to block the withdrawal of the said racks and section after passing a certain point, for the purpose set forth.

16. In a machine for operating on cans and other receptacles a can-holding clamp consisting of a fixed section and a movable section, a frame provided with an upper inner rack, and a lower inner rack, and connected to the said movable section, a guideway on which the said frame runs and which is cut away at a certain point to provide a shoulder engaging the rear end of the said frame when it falls below the same, so as to lock it against return while the clamp is closed, substantially as set forth.

17. In a machine for operating on cans and other receptacles, a can-holding clamp consisting of a fixed section and a movable section, in combination with a bar connected to the latter section for closing and opening the clamp, means for reciprocating the said bar, and a fixed device arranged to engage the said bar on its moving into another plane and lock it against withdrawal, substantially as and for the purpose set forth.

18. In a machine for operating on cans and other receptacles, a can-holding clamp, consisting of a fixed section and a movable section, in combination with a sliding part operating the latter section, means for engaging and reciprocating the said sliding part, supporting devices which permit the said sliding part to descend at a certain point of its forward travel, and a fixed shoulder arranged to prevent withdrawal after such descent, substantially as set forth.

19. In a machine for operating on cans and other receptacles a can-holding clamp, consisting of a fixed section and a movable section, in combination with a sliding part operating the latter section and free to have a certain amount of vertical play at the end of its forward travel, a fixed part arranged to lock it against return when it moves at this point out of its normal plane, automatic means for restoring it to its normal plane, and means for intermittently advancing and withdrawing the said sliding part and movable section substantially as set forth.

20. In a machine for operating on cans and other receptacles, a can-holding clamp, consisting of a fixed section and a movable section, in combination with a reciprocating bar operating the said movable section, and adapted to have a certain vertical play at the forward end of its travel, also provided with a frame having internally an upper rack and a lower rack, a rotary toothed segment engaging these racks alternately, a fixed shoulder arranged to lock the said frame and connected parts against withdrawal when it leaves its normal vertical plane, and a device automatically moved to engage an attachment of the said frame for moving it out of the locked position, and permitting its withdrawal substantially as set forth.

21. In a machine for operating on cans and other receptacles, a can-holding clamp consisting of a fixed section, a movable section, a reciprocating double rack for operating the latter to open and close the clamp, a guideway for said rack cut away at a certain point to provide a shoulder for engaging the said double rack to prevent withdrawal, a rotary toothed segment turning between the said racks to engage them alternately, a projection on the said double rack, and a device turning with the said segment, and arranged to strike the said projection and lift the said double rack out of its locked position substantially as set forth.

22. In a machine for operating on cans and other receptacles, a can-holding clamp consisting of a fixed section and a movable section, the latter having a rearward extension, a reciprocating bar linked to the said extension, and provided with a frame having an upper and a lower internal rack, a guideway cut away at one point to provide a shoulder adapted to engage the said frame and prevent the withdrawal of the same and attached parts, a rotary toothed segment turning within the said frame and adapted to engage alternately the upper and the lower rack, a stud on the said frame in proximity to the said upper rack and a cam or horn turning with the said segment and arranged to strike the said stud and lift the said frame out of its locked position, substantially as set forth.

23. In a machine for operating on cans and other receptacles, a can-holding clamp, consisting of a fixed section and a movable section, in combination with a rack and connections for withdrawing the latter and a rotary toothed segment for engaging the said rack to withdraw it, the said rack having its rearward tooth extended down below the others to insure contact with the first tooth of the segment and consequently the correct meshing of the remaining teeth of the said rack and segment, substantially as set forth.

24. In a machine for operating on cans and other receptacles, a can-holding clamp consisting of a fixed section and a movable section, in combination with a double rack and connections for advancing and withdrawing the latter section, supporting devices arranged to let the said double rack descend at the innermost point of its travel and lock it there against withdrawal and means for automatically lifting the said double rack out of such locked position, the last tooth of the upper rack being elongated for contact with the first tooth of the segment, to insure the proper meshing of the remaining teeth of the said segment and rack, substantially as set forth.

25. In a machine for applying covers to cans and other receptacles, the combination of a clamp for holding the latter, consisting of a fixed section and a section reciprocating in a right line to and from the same, with means for feeding the covers thereto, a plunger for pressing the covers down on the cans, and mechanism for reciprocating the said plunger, the interior surface of the said clamp being slightly tapered upward, substantially as set forth.

26. In a machine for applying covers to cans and other receptacles, a clamp for holding them, in combination with a plunger for pressing the covers down on them, an inclined plane connected rigidly to said plunger, a roller, a cranked driving-shaft, connections between said roller and the crank of the said shaft for driving the said roller up and along the inclined plane to force down the said plunger, a sliding piece arranged to be moved by the said roller, an annular crimping device consisting of two sections, and sliding devices whereby the said sliding piece moves one of the said sections toward the other, substantially as set forth.

27. In a machine for applying covers to cans, a cover-crimping device and means for closing the same on the cover, in combination with a clamp consisting of a fixed section and a movable section and reciprocating mechanism for moving the latter section toward and from the other to close and open the clamp, both of those sections being permanently in the line of motion of the section thus reciprocated, substantially as set forth.

28. In a machine for applying covers to cans, an annular sectional crimping device, in combination with a can-holding clamp having a movable section, mechanism for reciprocating the said section and one of the crimping jaws or sections together, and mechanism for independently reciprocating the said crimping-jaw, the said movable clamp-section carrying the said crimping-jaw, but permitting such independent additional motion of the latter, substantially as set forth.

29. In a machine for applying covers to cans and other receptacles, a can-holding clamp consisting of two sections in combination with mechanism for closing said clamp, a pair of crimping-jaws, positively-acting mechanism for closing the same on the cover and opening them independently of the corresponding movements of the said clamp-sections, a plunger acting on the covers and mechanism for reciprocating the said plunger, the proximate parts of the plunger and crimping-jaws being correspondingly beveled substantially as and for the purpose set forth.

30. In a machine for applying covers to cans and other receptacles a pair of curved jaws, adapted to crimp the annular flange of a cover on a can, in combination with a plunger for depressing the covers, a part rigidly connected to the said plunger and having an inclined upper face, a roller arranged to travel on the said face mechanism for reciprocating the said roller, a slide arranged to be struck by the said roller and provided with an inclined plane on its under side, a vertically-movable bar, depressed by the action of the said inclined plane, an adjustable wedge or inclined plane movable with said bar, an attachment of one of the crimping-jaws, actuated by contact with the said wedge to a greater or less extent, determined by such adjustment, and means for closing the other crimping-jaw substantially as set forth.

31. In mechanism for applying covers to cans and other receptacles, a pair of crimping-jaws, a plunger for depressing the covers, a part rigidly connected to the said plunger, and having an inclined plane on its upper side, a roller arranged to travel over the said inclined plane to depress the said plunger, a slide arranged to be moved by the said roller and provided with an inclined plane, a vertically-movable bar carrying a wedge, an attachment of one of the crimping-jaws arranged for contact with the said wedge to close the said jaw on the can-cover, and mechanism for correspondingly closing the other crimping-jaw, substantially as set forth.

32. In a machine for applying covers to cans or other receptacles, a can-holding clamp, consisting of two sections, one being permanently fixed, and reciprocating means for opening and closing the same, a pair of crimping-jaws, means for opening and closing the said jaws on the peripheral flange of the cover, and means for supplying a cover and forcing it down on the can for the purpose set forth.

33. In a machine for applying covers to cans or other receptacles, a pair of movable crimping-jaws and mechanism for positively closing the same by surfaces moving over each other in frictional contact, springs for opening said jaws and replacing the sliding parts, can-holding devices consisting of a fixed semicylindrical section and a horizontally-reciprocating semicylindrical section and means for supplying the covers and forcing them down on the can-bodies in position to be crimped by the said jaws for the purpose set forth.

34. In a machine for applying covers to cans and other receptacles, a can-holding clamp consisting of a fixed section, a movable section, mechanism for moving the latter section to and from the former, a chute directing cans into the said clamp, a finger extending up through said chute between the lower parts of the said cans operating to move the cans successively into the said clamp and mechanism for moving the said finger toward and from the said clamp, substantially as set forth.

35. In a machine for applying covers to cans and other receptacles, a can-holding clamp, a hopper or guide arranged above the same for the covers and cut away to admit them, a chute supplying the said covers, a gate closing the opening in the said hopper through which said covers enter and provided near its middle with an opening $o'$ and mechanism horizontally reciprocating the said gate and thereby presenting alternately the opening $o'$ and the solid terminal part of the said gate to open and close the said opening in the hopper, the said gate being bent in the middle to leave an opening $o'$ and having a solid terminal part $O^2$, substantially as set forth.

36. In a machine for applying covers to cans or other receptacles, a gate and can-feeding bar reciprocating together and arranged for the former to open the way for each cover, while the said bar forces the said cover into position above the can, mechanism for reciprocating the said gate and bar, means for holding a can in position under the said cover and means for pressing the cover on the can and fastening it there for the purpose set forth.

37. In a machine for applying covers to cans and other receptacles, the combination of a can-holding device and means for pressing a cover down upon the can, with a hopper arranged above the can and provided on one side with an opening to admit the covers, a chute supplying them to the said opening, a fixed guide arranged to prevent them from rising above the opening, a gate and inclined shoulder operating together, the former uncovering the said opening, while the latter forces the covers individually through the same, and mechanism for reciprocating the said gate and shoulder, substantially as set forth.

38. In a machine for applying covers to cans and other receptacles, a can-holding clamp, consisting of a fixed section and a section reciprocating to open and close said clamp, the two sections being adapted to fit the body of a can and remaining permanently in the same horizontal plane, mechanism for opening and closing the same, in combination with a plunger driving the covers on the can, and mechanism for operating the said plunger, a sectional cover-crimping device and mechanism for opening and closing the same, a positively-operating device for feeding the cans into the said clamp, and a positively-operating device for feeding the covers into the space above the said clamp, substantially as set forth.

39. In a machine for applying covers to cans and other receptacles, a can-holder in combination with a clamp, a hopper above the same cut away on one side to receive the covers, a plunger for forcing the covers down through the said hopper, a chute and guide for directing the covers to the said opening, a gate for the said opening, a device connected to and moving with the said gate for feeding the covers through the said opening into the said hopper, means for positively operating the said gate and the said device, means for supplying cans to the said clamp, a crimping device arranged to act on the said cover after it has been applied to the can, and mechanism for operating the said crimping device, substantially as set forth.

40. In a machine for applying covers to cans, a pair of crimping-jaws having their inner faces beveled inwardly and downwardly in combination with a plunger, having its operative face beveled inwardly and downwardly at the periphery, a sectional can-holding clamp, consisting of two semicylindrical sections and having the upper part of its interior tapered inwardly upward for a part or the whole of its length and mechanism for reciprocating the said plunger opening and closing the said clamp and crimping-jaws, substantially as set forth.

41. In a can capping and crimping machine, the combination of a plunger and a pair of crimping-jaws with a shaft, connections whereby a single rotation of the said shaft operates both of the said devices, the said plunger acting on the head of the can to depress the middle part thereof and to spread the end of the can-body and means for holding the can-body stationary while in the machine, substantially as set forth.

42. A combination of a can-encircling clamp in two parts adapted to compress, center and shape a can in a vertical position so as to receive on its upper end a tight-fitting flanged cover; mechanism for positively delivering cans into said clamp, and discharging them therefrom; mechanism to cause one part of said clamp to move forward and back horizontally so as to open and close the clamp for the purpose of receiving and discharging the cans; a hopper or guide-ring fixed above said clamp with an opening on one of its sides adapted to receive can-covers flatwise and hold them centrally above the top ends of the cans in said clamp to insure precision in bringing the covers and the top ends of the cans into union; mechanism for positively delivering the covers flatwise and singly into said hopper; a vertically-moving plunger supported above the hopper in direct line with the cans when compressed in the clamp, having its lower face shaped to act as a spreader to slightly expand the top ends of the cans to make the crimping perfect; mechanism to alternately depress and lift said plunger; a beveled crimping-ring in two parts adapted to encircle and compress the flanges of the covers upon the can-bodies while held rigidly compressed by said clamp and under pressure of said plunger; mechanism to actuate the two parts of said crimping-ring to open and close in proper time to accomplish said purpose, and to admit the covers to a union with the cans and release them; all of said parts acting in combination to put a cover on a can and crimp the flange at each revolution of a crank-shaft, substantially as described in the foregoing specification.

In witness whereof I hereunto set my signature, in presence of witnesses, this 9th day of July, 1903.

CORNELIUS H. HANFORD.

Witnesses:
JAMES E. BABCOCK,
ROSE E. BABCOCK.